(12) United States Patent
Creech et al.

(10) Patent No.: US 11,118,665 B2
(45) Date of Patent: Sep. 14, 2021

(54) ELECTRICAL DIFFERENTIAL LOCKER WITH EDDY CURRENT SENSOR

(71) Applicant: Dana Automotive Systems Group, LLC, Maumee, OH (US)

(72) Inventors: Michael Z. Creech, Ann Arbor, MI (US); Justin S. Davis, Maumee, OH (US); Robert D. Keller, Haskins, OH (US); Terry W. McGraner, Toledo, OH (US); Timothy R. Zuehlke, Oregon, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 79 days.

(21) Appl. No.: 16/225,361

(22) Filed: Dec. 19, 2018

(65) Prior Publication Data

US 2019/0195327 A1   Jun. 27, 2019

Related U.S. Application Data

(60) Provisional application No. 62/609,439, filed on Dec. 22, 2017.

(51) Int. Cl.
| | | |
|---|---|---|
| *F16H 48/24* | (2006.01) | |
| *F16H 48/34* | (2012.01) | |
| *B60K 23/04* | (2006.01) | |
| *F16H 48/40* | (2012.01) | |
| *B60K 17/16* | (2006.01) | |
| *F16H 48/08* | (2006.01) | |

(52) U.S. Cl.
CPC ............ *F16H 48/24* (2013.01); *B60K 17/16* (2013.01); *B60K 23/04* (2013.01); *F16H 48/08* (2013.01); *F16H 48/34* (2013.01); *F16H 48/40* (2013.01); *B60K 2023/046* (2013.01)

(58) Field of Classification Search
CPC .......... F16H 48/24; F16H 48/34; F16H 48/40; F16H 48/08–087; B60K 23/04; B60K 2023/046
See application file for complete search history.

(56) References Cited

U.S. PATENT DOCUMENTS

| | | | |
|---|---|---|---|
| 5,897,601 A | 4/1999 | Suzuki | |
| 6,857,982 B2 | 2/2005 | Tomari | |
| 6,945,895 B2* | 9/2005 | Fusegi | B60K 23/04 180/247 |
| 7,074,150 B2* | 7/2006 | Fusegi | B60K 23/04 475/150 |
| 7,211,020 B2 | 5/2007 | Gohl | |
| 7,247,118 B2* | 7/2007 | Haruki | F16H 48/08 335/279 |
| 7,325,664 B2* | 2/2008 | Fusegi | F16D 27/118 192/84.92 |
| 7,357,749 B2 | 4/2008 | Nofzinger | |

(Continued)

*Primary Examiner* — David R Morris
(74) *Attorney, Agent, or Firm* — McCoy Russell LLP (57) ABSTRACT

An actuator assembly including a housing. The housing having an actuator component, an armature, and at least a portion of a sensor disposed therein. The armature is selectively positionable between a first position and a second position. The sensor includes at least one sensing element disposed within the housing adjacent to the armature. The sensing element has a physical property which varies based upon a position of the armature within the housing.

20 Claims, 8 Drawing Sheets

(56) References Cited

U.S. PATENT DOCUMENTS

| | | | |
|---|---|---|---|
| 7,744,500 B2 | 6/2010 | Donofrio | |
| 7,775,926 B2* | 8/2010 | Sugaya | F16H 48/34 |
| | | | 475/85 |
| 7,780,565 B2* | 8/2010 | Fusegi | F16H 48/34 |
| | | | 475/230 |
| 8,050,829 B2* | 11/2011 | Johnson | F16H 48/30 |
| | | | 701/51 |
| 8,348,799 B2* | 1/2013 | Maruyama | F16H 48/08 |
| | | | 475/150 |
| 9,556,945 B2 | 1/2017 | Fox | |
| 9,625,026 B2 | 4/2017 | Cochren | |
| 9,970,525 B2* | 5/2018 | Zaers | F16H 48/08 |
| 10,173,525 B2* | 1/2019 | Kamitani | F16H 48/40 |
| 10,267,400 B2* | 4/2019 | Kamitani | F16D 11/14 |
| 10,308,113 B2* | 6/2019 | Inose | F16H 48/24 |
| 10,596,901 B2* | 3/2020 | Yoshisaka | F16D 27/108 |
| 2002/0155913 A1* | 10/2002 | Fusegi | B60K 23/04 |
| | | | 475/150 |
| 2003/0054914 A1* | 3/2003 | Tomari | F16H 48/34 |
| | | | 475/231 |
| 2005/0187063 A1* | 8/2005 | Haruki | F16H 48/34 |
| | | | 475/231 |
| 2005/0277510 A1* | 12/2005 | Fusegi | B60K 23/04 |
| | | | 475/231 |
| 2005/0279607 A1* | 12/2005 | Fusegi | F16H 48/08 |
| | | | 192/84.96 |
| 2006/0270508 A1* | 11/2006 | Gohl | F16H 48/24 |
| | | | 475/220 |
| 2007/0142157 A1* | 6/2007 | Nofzinger | F16H 48/08 |
| | | | 475/231 |
| 2008/0015076 A1* | 1/2008 | Fusegi | F16H 48/34 |
| | | | 475/252 |
| 2008/0254931 A1* | 10/2008 | Sugaya | F16H 48/24 |
| | | | 475/238 |
| 2009/0247350 A1* | 10/2009 | Donofrio | F16H 48/34 |
| | | | 475/231 |
| 2010/0056314 A1* | 3/2010 | Maruyama | F16H 48/24 |
| | | | 475/150 |
| 2010/0179736 A1* | 7/2010 | Johnson | F16H 48/30 |
| | | | 701/51 |
| 2015/0133254 A1* | 5/2015 | Fox | F16H 48/08 |
| | | | 475/150 |
| 2015/0204431 A1* | 7/2015 | Cochren | F16H 48/08 |
| | | | 475/150 |
| 2016/0273637 A1* | 9/2016 | Zaers | F16H 48/24 |
| 2016/0319925 A9* | 11/2016 | Cochren | F16H 48/40 |
| 2017/0291492 A1* | 10/2017 | Kamitani | B60K 23/04 |
| 2017/0292596 A1* | 10/2017 | Kamitani | B60K 23/04 |
| 2017/0297428 A1* | 10/2017 | Inose | B60K 23/04 |
| 2018/0361850 A1* | 12/2018 | Yoshisaka | F16D 11/14 |
| 2019/0226566 A1* | 7/2019 | Hillman | B60K 17/16 |

\* cited by examiner

FIG. 8

ELECTRICAL DIFFERENTIAL LOCKER WITH EDDY CURRENT SENSOR

CROSS REFERENCE TO RELATED APPLICATION

This application is entitled to claim the benefit of, and claims priority to, U.S. provisional patent application Ser. No. 62/609,439 filed Dec. 22, 2017, the entire disclosure or which is incorporated herein by reference.

FIELD

The subject matter of the embodiments described herein relates generally to an axle assembly and means of torque conveyance and, more particularly, to a differential apparatus with an eddy current sensor for the axle assembly.

BACKGROUND

Axle assemblies in vehicle drivetrains are known to employ a differential apparatus to transmit torque from a power source to vehicle wheels. The differential apparatus permits an outer drive wheel to rotate at a greater velocity than an inner drive wheel when operating a vehicle through a turn, and the differential apparatus divides the power between the connected vehicle wheels.

A conventional differential apparatus is drivingly engaged with a drive pinion, which is turned by a driveshaft connected to the power source. The drive pinion is meshed with a ring gear attached to a differential case. Differential pinions are mounted on the opposite ends of a spider shaft located through the differential case. The differential pinions are meshed with side gears connected to axle half shafts coupled with one or more wheels.

When both wheels have equal traction, the pinion gears do not rotate on the spider shaft because the input force of the pinion gears is divided equally between the two side gears. When the vehicle is operated through a turn, the inner wheel slows down and the associated side gear also slows down, while the outer wheel and associated side gear speed up.

A well-known disadvantage of an axle assembly utilizing the differential apparatus occurs when one wheel is unintentionally stationary, and all of the power can only be transferred to the remaining movable wheel. Limited-slip and locking differentials were developed to overcome this disadvantage. In limited-slip differentials, driving force is provided to the wheel with the most traction before the other wheel begins to slip. Limited-slip differentials typically operate with selectively activated clutches. Locking differentials operate similarly to limited-slip differentials, except that when the vehicle wheels are rotating at different speeds the differential locks the axle half shafts together to rotate as a unitary shaft.

In conventional locking differentials, the differential apparatus is locked utilizing a device to engage a locking gear with the differential. This locking gear militates against differentiation, which militates against independent movement of the two axle half shafts. Known designs are disadvantaged by a locking gear that may not immediately engage with the differential apparatus, leading to uncertainty regarding the locked state of the differential apparatus.

In view of the disadvantages of the known designs, it would be desirable to remove the need for a magnet and a follower plate, thereby reducing cost, weight and complexity. It would also be desirable to use a non-contact type sensor to prevent wear. In addition, it would be desirable to know the exact position of the locking gear at all times.

SUMMARY

In concordance and agreement with the present disclosure, an axle assembly including a differential apparatus and an actuator assembly having a sensor which minimizes cost, weight, and complexity while enhancing durability and accuracy, has surprisingly been discovered.

In one embodiment, an actuator assembly, comprises: a housing; an actuator component disposed within the housing; an armature disposed within the housing, the armature selectively positionable between a first position and a second position; and a sensor including a first sensing element disposed within the housing adjacent to the armature, wherein a physical property of the first sensing element varies based upon a position of the armature.

In another embodiment, a method of determining a state of a differential apparatus, comprising the steps of: providing an axle assembly including a differential apparatus and an actuator assembly coupled to the differential apparatus, wherein the differential apparatus includes a locking gear, and wherein the actuator assembly includes a housing having an actuator component, an armature, and a sensor disposed therein, wherein the armature is selectively positionable between a first position and a second position, wherein the sensor includes a first sensing element disposed within the housing adjacent to the armature, and wherein a physical property of the first sensing element varies based upon a position of the armature; measuring the physical property of the first sensing element; transmitting the measured physical property of the first sensing element from the sensor to a controller; determining a position of the armature based upon the measured physical property of the first sensing element; and determining the state of the differential apparatus based upon the position of the armature.

Aspects of certain embodiments, the sensor is an eddy current sensor.

Aspects of certain embodiments, the armature is drivingly coupled to a differential apparatus.

Aspects of certain embodiments, the actuator assembly further comprises a spacer at least partially disposed within the housing.

Aspects of certain embodiments, the actuator assembly further comprises a controller coupled to the housing, wherein the controller is in electrical communication with the sensor.

Aspects of certain embodiments, the first sensing element is disposed between the armature and housing.

Aspects of certain embodiments, the first sensing element is disposed between the armature and the actuator component.

Aspects of certain embodiments, the first sensing element is disposed in a recess formed in the housing.

Aspects of certain embodiments, the actuator assembly further comprises a second sensing element disposed within the housing adjacent to the armature.

Aspects of certain embodiments, the sensor includes an array of at least one of the first sensing elements and the second sensing elements.

Aspects of certain embodiments, at least one of the first sensing element and the second sensing element is a coil.

Aspects of certain embodiments, a physical property of the second sensing element varies based upon a position of the armature.

Aspects of certain embodiments, the physical property of at least one of the first sensing element and the second sensing element is inductance.

Aspects of certain embodiments, the method further comprises the step of: determining a position of the locking gear of the differential apparatus based upon the position of the armature.

Aspects of certain embodiments, the method further comprises the steps of: measuring the physical property of the second sensing element; transmitting the measured physical property of the second sensing element from the sensor to the controller; and determining the position of the armature based upon the measured physical property of at least one of the first sensing element and the second sensing element.

Aspects of certain embodiments, the method further comprises the step of: differentiating between the inductance of the first and second sensing elements to compensate for a variation in a radial position of the armature.

BRIEF DESCRIPTION OF THE DRAWINGS

The above, as well as other objects and advantages of the subject matter of the embodiments described herein, will become readily apparent to those skilled in the art from a reading of the following detailed description of the embodiments when considered in the light of the accompanying drawings in which.

DETAILED DESCRIPTION

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Locking differentials are utilized in applications across multiple industries including automotive, aerospace, industrial automation equipment, and instrumentation applications. In one embodiment, the subject matter disclosed herein may be utilized in the operation of an all-wheel drive vehicle.

Figure 1:
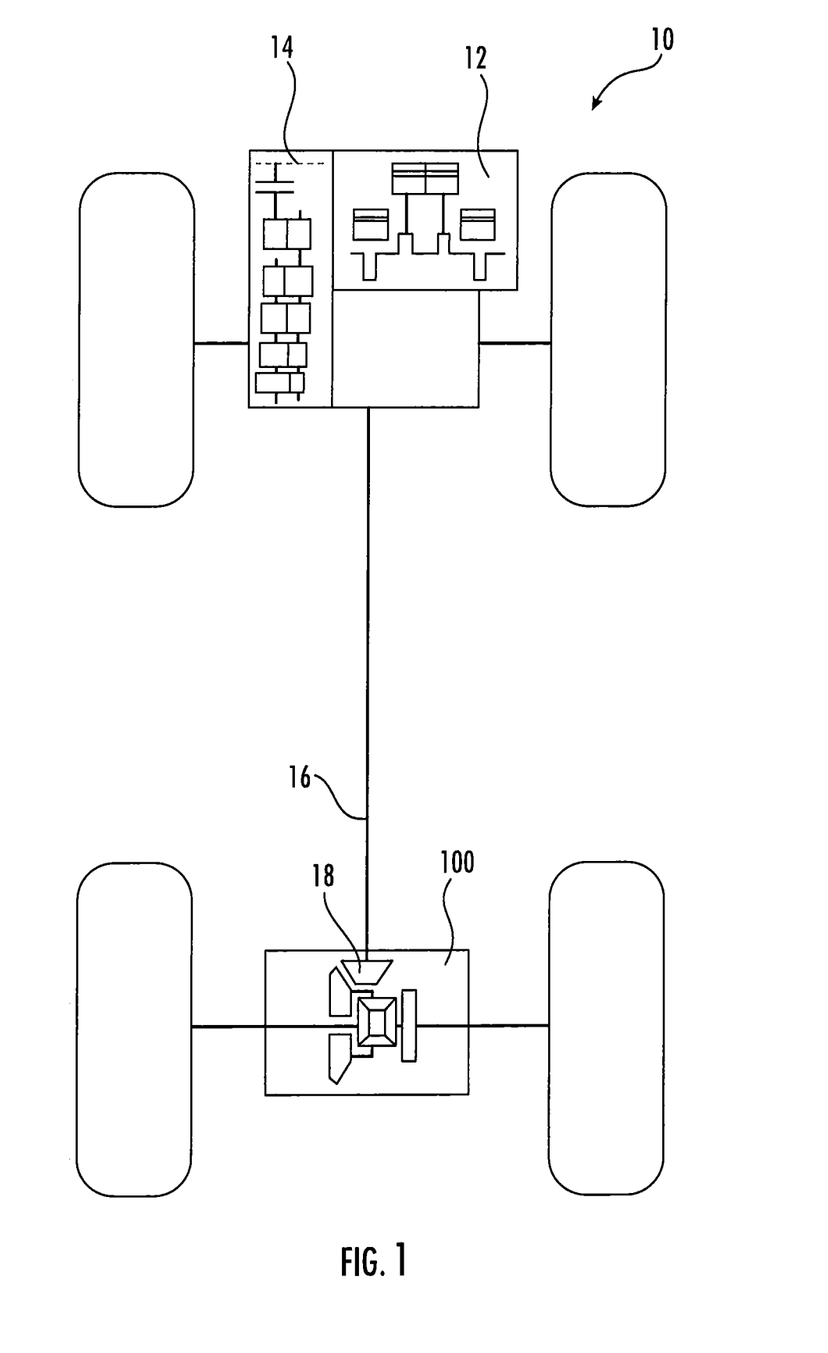
FIG. 1 is a schematic illustration of a vehicle according to an embodiment of the presently disclosed subject matter.

As illustrated in FIG. 1, in an embodiment, a vehicle 10 includes a motor 12 (e.g. an internal combustion engine) driveably connected with a transmission 14. An output of the transmission 14 is driveably connected with an axle assembly 100 via a propeller shaft 16. The axle assembly 100 is depicted as a rear axle assembly; however, persons skilled in the relevant art will recognize that the axle assembly 100 described herein may be located as a front axle, a rear axle, or one of a tandem axle pair.

Embodiments of axle assembly 100 are described below. The axle assembly 100 may be utilized with an all-wheel drive vehicle, a pure electric vehicle and a hybrid four-wheel-drive vehicle where the front axle is driven by the motor 12, and the rear axle includes the axle assembly 100 (or vice versa). In still other embodiments, the axle assembly 100 may be utilized in a hybrid commercial vehicle (not depicted) comprising a tandem axle in which the front tandem axle is driven by an internal combustion engine, and the rear tandem axle includes one of the axle assembly 100 (or vice versa). The axle assembly 100 may have applications in commercial vehicles, both light duty and heavy duty vehicles, and for passenger, off-highway, and sport utility vehicles. Additionally, the axle assembly 100 described herein may be adapted for use in front and/or rear driving axles, and in steerable and non-steerable axles. It would be understood by one of ordinary skill in the art that the axle assembly 100 also may have industrial, locomotive, military, agricultural, and aerospace applications.

In certain embodiments, the axle assembly 100 may employed in an integrated drive system. The axle assembly 100 may include an electric motor (not depicted) (e.g., electromotor) coupled with a power source (not depicted). The electric motor may be a permanent magnet synchronous machine comprising a stator disposed concentrically about a rotor. The axle assembly 100 may additionally comprise an inverter (not depicted) for converting direct current to alternating current when the electric motor is utilized to drive the vehicle, and for converting alternating current to direct current when the vehicle decelerates. The electric motor may be referred to herein as a motor-generator. Further, the axle assembly 100 may include cooling fluid (not depicted) such as, but not limited to, automatic transmission fluid or axle oil integrated with the axle assembly 100 for cooling the electric motor and the inverter. In another embodiment (not depicted), the cooling fluid for the electric motor and the inverter may not be integrated with the axle oil. The axle assembly 100 may have either a co-axial or off-axis layout where the axle shaft connecting the wheel to the differential does not pass through the center or the motor but rather parallel to the motor axis.

Figure 2:
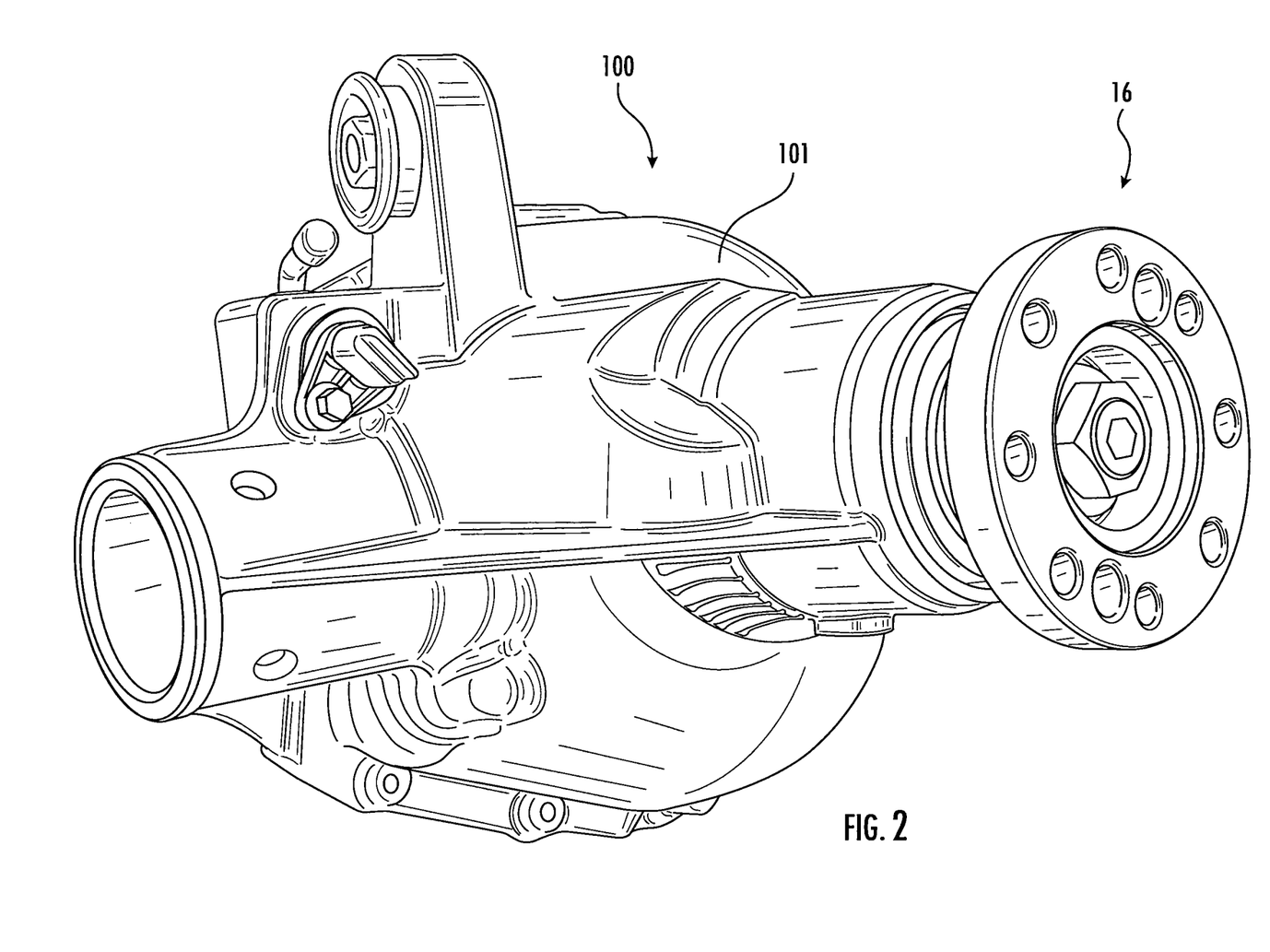
FIG. 2 is side perspective view of an axle assembly schematically depicted in FIG. 1 according to an embodiment of the presently disclosed subject matter.

The axle assembly 100 depicted in FIG. 2 includes a carrier housing 101. As more clearly illustrated in FIG. 4, the pinion gear 18, shown in FIG. 1, and at least a portion of the propeller shaft 16 are rotatably supported within the carrier housing 101 via one or more bearings 103.

Figure 3:
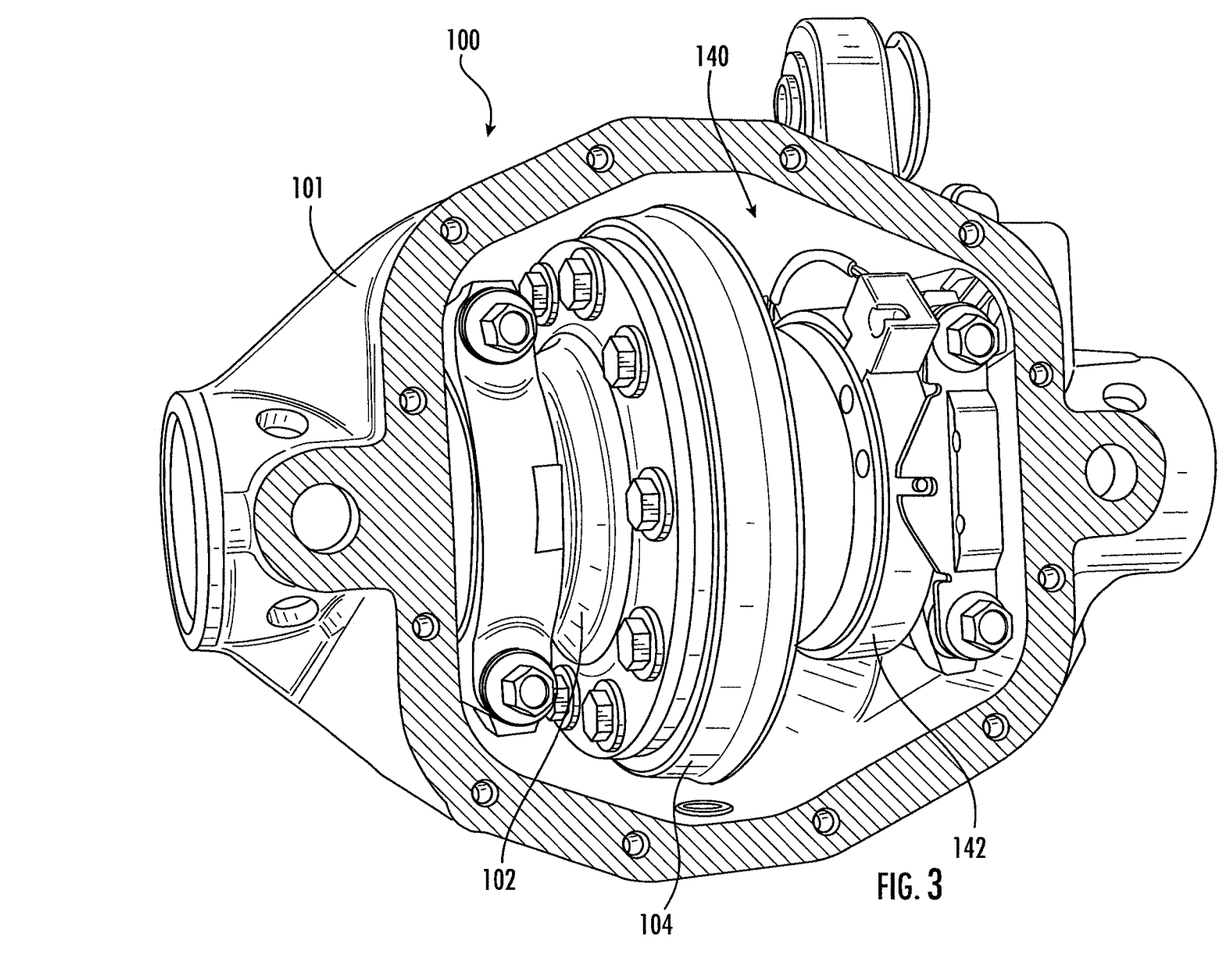
FIG. 3 is rear perspective view of the axle assembly shown in FIG. 2, wherein a portion of a carrier housing has been removed to show a differential apparatus and an actuator assembly coupled thereto.
Figure 4:
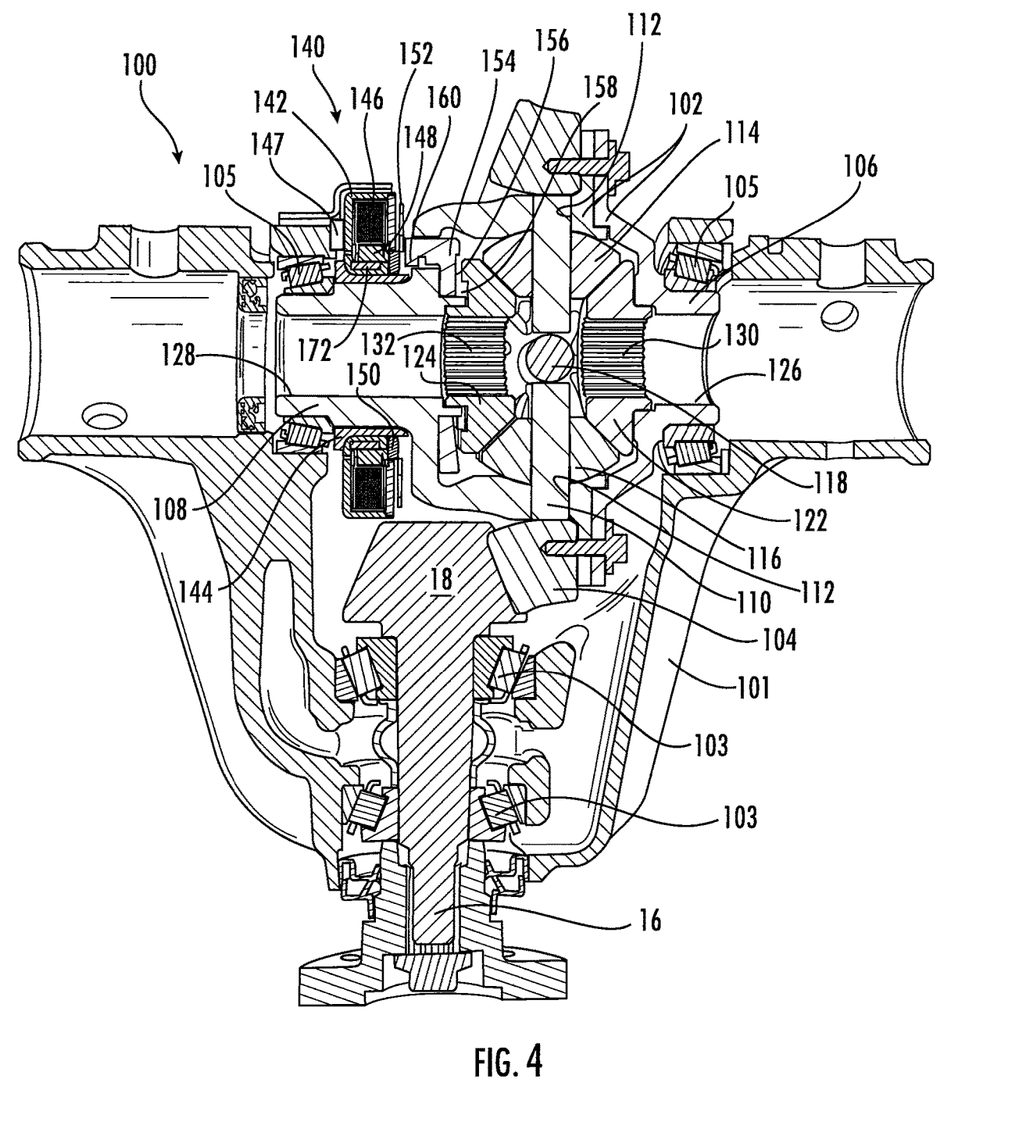
FIG. 4 is a top plan view, partially in section, of the axle assembly shown in FIGS. 2-3, wherein the portion of the carrier housing has been removed to show a propeller shaft, a pinion gear, the differential apparatus, and the actuator assembly.

Now referring to FIGS. 3 and 4, the axle assembly 100 includes a differential mechanism comprising a differential case 102 mounted for rotation within the carrier housing 101. The pinion gear 18 is in meshed engagement with a ring gear 104, and conveys torque to the differential case 102 via the ring gear 104. The ring gear 104 may be integrally formed with the differential case 102, or may be coupled with the differential case 102 via welding or mechanical fasteners.

The differential case 102 is mounted for rotation within the carrier housing 101 via a pair of bearings 105. The bearings 105 are disposed about a first and second trunnion 106, 108, respectively, on opposing portions of the differential case 102. In an embodiment, the differential case 102 may be produced via the process of flow forming a metallic material such as, but not limited to, steel, premium carbon steel, aluminum, and aluminum alloys.

Figure 5:
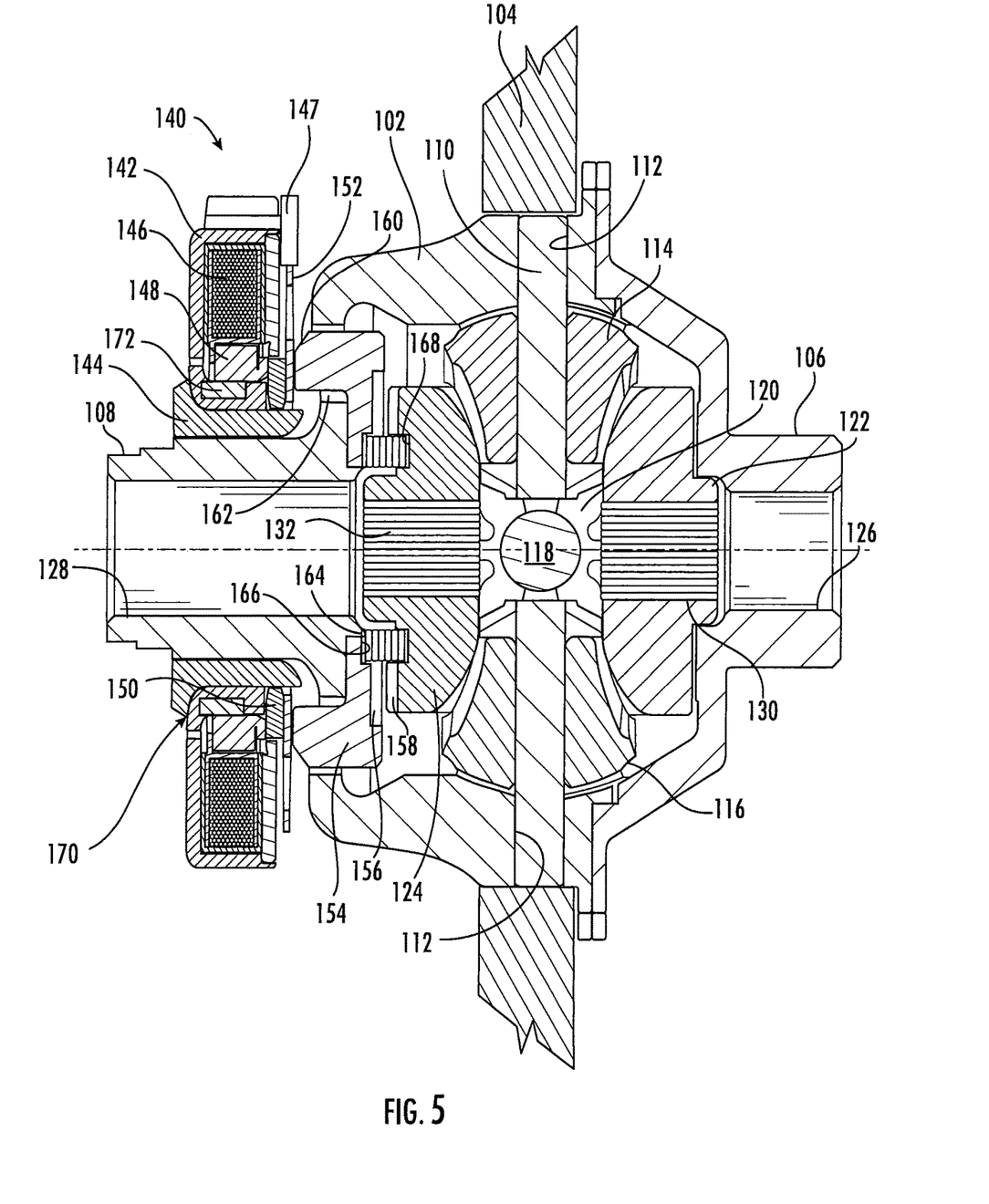
FIG. 5 is a top plan view, partially in section, of the differential assembly and the actuator assembly coupled thereto according to the embodiment shown in FIG. 4.

With reference to FIGS. 4 and 5, a first pinion shaft 110 is disposed in the differential case 102. In an embodiment, the first pinion shaft 110 extends through the differential case 102 and is coupled at its ends in two opposing apertures 112 through the differential case 102. First and second pinion gears 114, 116, are mounted on each end of the first pinion shaft 110, respectively. In certain embodiments, as more clearly illustrated in FIG. 5, a second pinion shaft 118 extends into the differential case 102 transverse the first pinion shaft 110 and is coupled at its ends with the differential case 102. A third pinion gear 120 and a fourth pinion gear (not depicted) are rotatably supported on the ends of the second pinion shaft 118. In other embodiments, not shown, the pinion gears 120, (not depicted) are supported by a unitary cross pin.

The pinion gears 114, 116, 120, (not depicted) are meshed with a first side gear 122 and a second side gear 124 within the differential case 102. The side gears 122, 124 comprise radially inward projecting splines 130, 132, respectively, to engage axle half shafts (not depicted) or stub shafts (not depicted). The differential case 102 comprises openings 126, 128 through the differential case trunnions 106, 108 to accommodate the axle half shafts coupled with the side gears 122, 124. The axle half shafts are inserted into the openings 126, 128 and into the side gears 122, 124 where they engage the internal splines 130, 132 of the side gears 122, 124, respectively. In an embodiment, the axle half shafts are secured in their position in the axle assembly 100 by c-clips (not depicted) inserted into grooves in the axle half shafts.

As illustrated in FIGS. 3-5, an actuator assembly 140 is mounted on the differential case trunnion 108. The actuator assembly 140 is coupled with the differential case 102 such that the actuator assembly 140 is fixed against rotation relative to the differential case 102. Referring now to FIG. 5, the actuator assembly 140 comprises a housing 142. In an embodiment, the housing 142 may have an annular geometry such that an inner portion of the housing 142 is coupled with a sleeve 144. The sleeve 144 is coupled with the differential case trunnion 108. An actuator component 146 such as an electromagnetic coil, for example, is disposed within the housing 142. The actuator component 146 is in electrical communication with a power source (not depicted), such as, but not limited to, a battery. The actuator component 146 may also be in communication with a controller 147. In an embodiment shown in FIG. 5, the controller 147 may be mounted to an inboard portion of the housing 142. In another embodiment shown in FIG. 6, the controller 147 may be mounted to an outboard surface of the housing 142. In still another embodiment shown in FIG. 7, the controller 147 may be mounted to a radially outer surface of the housing 142.

A generally hollow-cylindrical armature 148 is disposed in the housing 142, radially between the actuator component 146 and the inner portion of the housing 142. In an embodiment, the armature 148 does not rotate relative to the housing 142. The armature 148 comprises a ferromagnetic material. Disposed axially adjacent to the armature 148, on an inboard side thereof, is an annular spacer 150. The annular spacer 150 may be comprised of a polymeric material. In an embodiment, as illustrated in FIG. 5, a pressure plate 152 may be positioned axially adjacent to an inboard side of the spacer 150. However, those skilled in the relevant art will recognize that the actuator assembly 140 may be designed without the pressure plate 152. Further, a locking gear 154 is disposed axially between the spacer 150 and the side gear 124. The locking gear 154 defines a plurality of teeth 156 located on an axially inboard surface thereof. The locking gear teeth 156 selectively engage complimentary teeth 158 defined by an axially outboard surface of the side gear 124.

The locking gear 154 is axially slideable between a first position, illustrated in FIG. 5, where the locking gear 154 is disengaged from the side gear 124, and a second position (not depicted) where the locking gear 154 is engaged with the side gear 124. The locking gear 154 rotates with the differential case 102. In an embodiment, the locking gear 154 comprises generally axial protrusions 160 disposed through openings 162 in the differential case 102. The mechanical interaction between the locking gear protrusions 160 and the differential case openings 162 causes the locking gear 154 to rotate with the differential case 102.

In an embodiment, the armature 148 is coupled with the locking gear 154. In one embodiment, the armature 148 and the locking gear 154 may be coupled with the spacer 150, such that they move axially as a single unit. The armature 148 and the locking gear 154 may be coupled with the spacer 150 via a snap-fit connection, for example. Coupling the armature 148 and the locking gear 154 prevents the armature 148 from being vibrated into a disengaged position while the locking gear 154 remains in an engaged position. In an embodiment, the locking gear 154 may remain temporarily engaged even when the armature 148 is in a disengaged position, due to the key-stone shape of the differential case openings 162 creating an axial force on the locking gear 154 during torque transmission.

A biasing member 164 is disposed axially between the locking gear 154 and the side gear 124. In an embodiment, the locking gear 154 defines a groove 166 located in an inboard surface thereof. The locking gear groove 166 is aligned with a groove 168 defined in an outboard surface of the side gear 124. The biasing member 164 may be at least partially located within the grooves 166, 168. The biasing member 164 may be, but is not limited to, one or more springs, one or more wave springs, or one or more Bellville-type washers. In an embodiment, the locking gear groove 166 and the side gear groove 168 are annular in geometry.

To lock the differential mechanism of the axle assembly 100, in the second position of the locking gear 154, a signal from the controller 147 causes electricity, which may also be referred to herein as an excitation voltage, to be supplied to the actuator component 146. The energized actuator component 146 generates a magnetic flux. The magnetic flux of the actuator component 146 causes the armature 148 to move in an axial direction and drive the locking gear 154 into engagement with the side gear 124, thereby compressing the biasing member 164. To return the locking gear 154 to the first position, and unlock the differential mechanism, the controller 147 causes the supply of electricity to the actuator component 146 to be interrupted or reduced. The termination or reduction in the energization of the actuator component 146 enables the biasing member 164 to urge the locking gear 154 in an axial outboard direction and disengage the side gear 124. When the actuator component 146 is energized, the locking gear 154 may not immediately engage the side gear 124. This time delay may lead to an uncertainty regarding the locked/un-locked state of the differential mechanism. To determine the axial position of the locking gear 154, and therefore the locked/un-locked state of the differential mechanism, a sensor 170 may be utilized. Various types of sensors may be utilized for the sensor 170 such as an eddy current sensor, for example.

Figure 6:
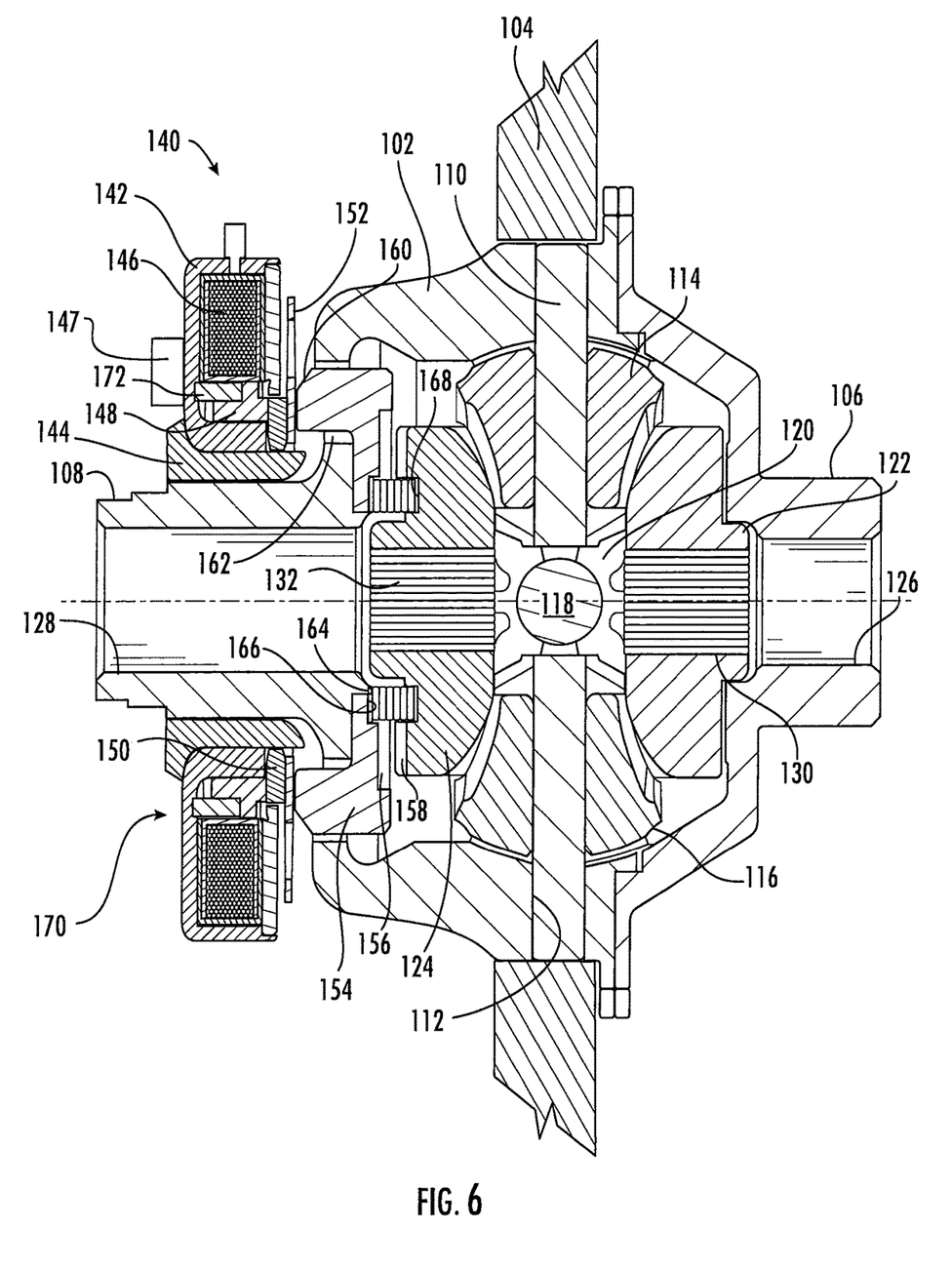
FIG. 6 is a top plan view, partially in section, of a differential assembly and an actuator assembly coupled thereto according to another embodiment of the presently disclosed subject matter.

In an embodiment, the sensor 170 may comprise a sensing element 172 having certain physical properties (e.g. an inductance) disposed concentrically about a portion of the actuator assembly 140. The sensing element 172 shown has a generally disc shape. It is understood, however, that the sensing element 172 may have any shape and size as desired such as a substantially planar plate, for example. As illustrated in FIG. 5, the sensor 170 includes the sensing element 172 disposed in an annular recess defined by in the inner portion of the housing 142 radially between the inner portion of the housing 142 and the armature 148. In another embodiment, as illustrated in FIG. 6, the sensor 170 includes the sensing element 172 disposed radially between the actuator component 146 and the armature 148.

The inductance of the sensing element 172 varies based upon a position of the armature 148 and is sensitive to a percentage of the armature 148 which overlaps the sensor 170. The radial distance between the sensing element 172 and the armature 148, ideally, remains constant. Actuation of the armature 148 moves the armature 148 axially parallel to the sensor 170 causing a change in the inductance of the sensing element 172. The inductance in the sensing element 172 is proportional to the axial position of the armature 148. The inductance in the sensing element 172 is measured and transmitted to the controller 147 which utilizes the measured inductance, i.e., conditions the sensor 170 output signal, to determine the locked/un-locked state of the locking gear 154 and the differential mechanism.

Figure 7:
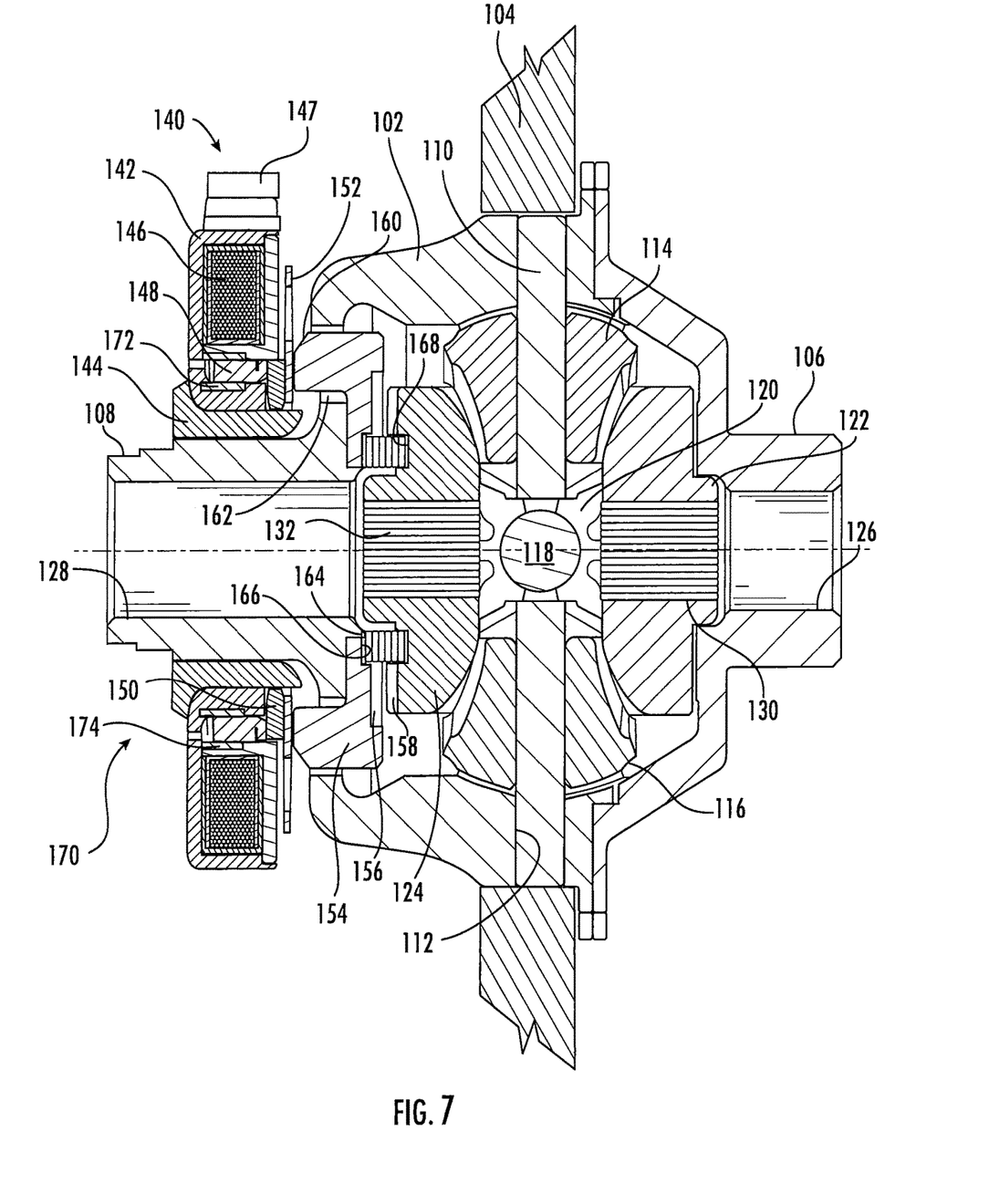
FIG. 7 is a top plan view, partially in section, of a differential assembly and an actuator assembly coupled thereto according to another embodiment of the presently disclosed subject matter.

In an embodiment, as illustrated in FIG. 7, the sensor 170 may comprise a first sensing element 172 located radially between the inner portion of the housing 142 and the armature 148, and a second sensing element 174 located radially between the armature 148 and the actuator component 146. In this embodiment, utilizing two sensing elements 172, 174 disposed concentric with the armature 148 removes error created by any variation in the radial distance between the armature 148 and the sensing elements 172, 174. As one portion of the armature 148 moves closer to the first sensing element 172, a second portion of the armature 148 moves away from the second sensing element 174. Differentiating between the inductance in the first and second sensing elements 172, 174 compensates for the noise added to the signal of the sensor 170 from variations in the radial position of the armature 148.

In any of the embodiments described herein, the sensing elements 172, 174 may comprise a flexible material to facilitate the contour thereof about the housing 142 when the sensing elements 172, 174 are embedded within the actuator assembly 140. In an embodiment, the sensing elements 172, 174 may comprise a flexible printed circuit board ("PCB").

Figure 8:
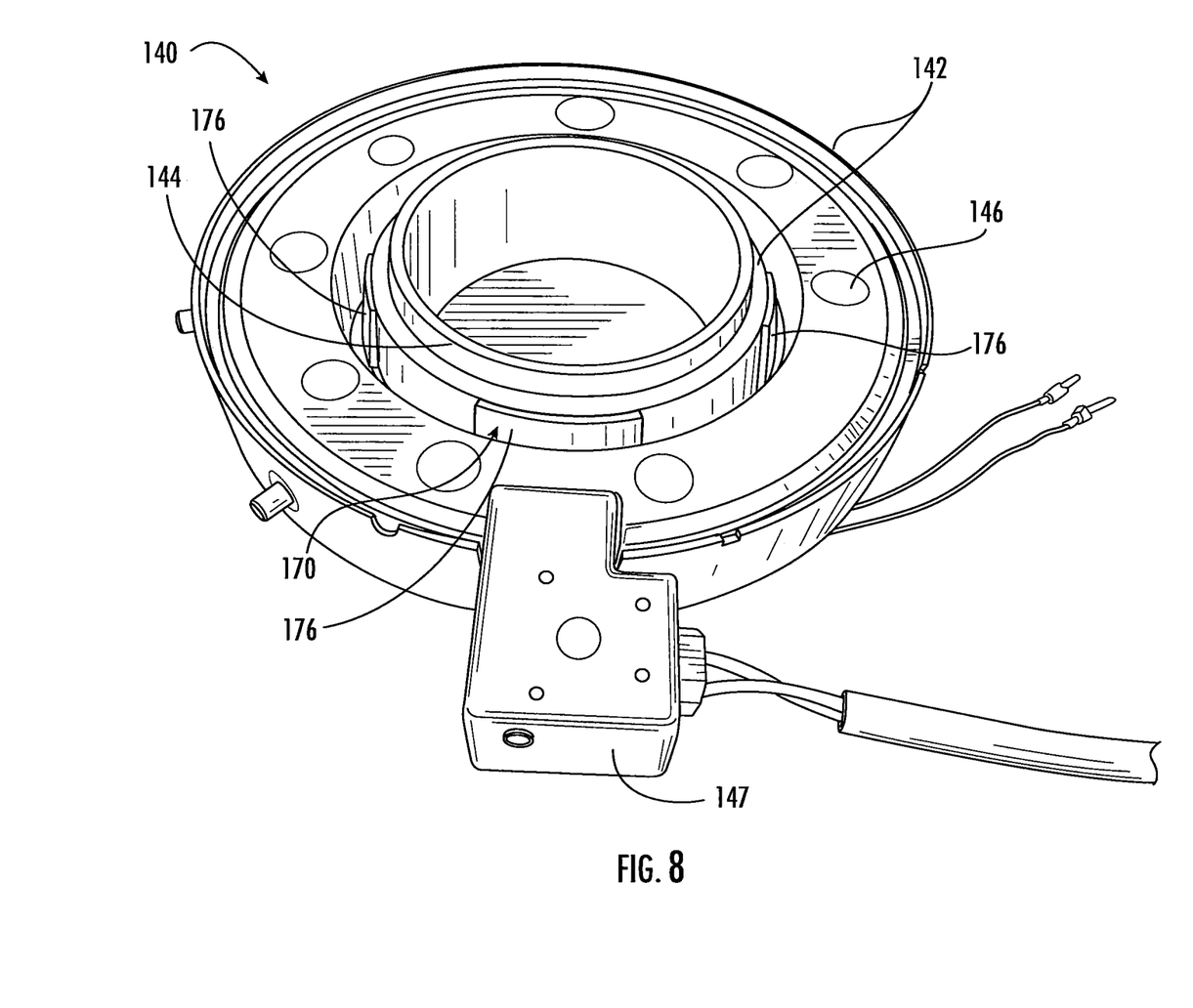
FIG. 8 is a side perspective view of an actuator assembly according to yet another embodiment of the presently disclosed subject matter.

In another embodiment, as illustrated in FIG. 8, the sensor 170 may include a sensing element 176 which comprises a partial disc, rather than a full disc such as the sensing element 172. The sensing element 176 may be coupled with a portion of the housing 142 located on either radial side of the armature 148. Similar to the embodiment described with regard to FIG. 7, the actuator assembly 140 may comprise an array of sensing elements 176, such that differentiating the inductance therebetween reduces the noise of the sensor signal from variations in the radial position of the armature 148. It should be appreciated that the array of sensing elements 176 may employ various sizes, shapes, and spacing of the sensing elements 176 as desired.

The embodiments of the sensor 170 described above may also be utilized with other clutch types, including, but not limited to, a worm gear type clutch (not depicted) and a clutch including a fork (not depicted).

From the foregoing description, one ordinarily skilled in the art can easily ascertain the essential characteristics of the subject matter of the embodiments described herein and, without departing from the spirit and scope thereof, can make various changes and modifications to the embodiments to adapt them to various usages and conditions.

What is claimed is:

1. An actuator assembly, comprising:
a housing;
an actuator component disposed within the housing;
an armature disposed within the housing radially aligned with the actuator component, the armature selectively axially positionable between a first position and a second position; and
a sensor including a first sensing element disposed both within the housing radially adjacent to the armature and in an annular recess defined by an inner wall of the housing, wherein a physical property of the first sensing element varies based upon a position of the armature and wherein the armature is positioned radially between the first sensing element and the actuator component and an axial movement of the armature between the first and second positions changes an amount of the armature which is positioned radially between the first sensing element and the actuator component.

2. The actuator assembly according to claim 1, wherein the sensor is an eddy current sensor, and wherein the first sensing element is disposed concentrically about a portion of the actuator component.

3. The actuator assembly according to claim 1, wherein the armature is drivingly coupled to a differential apparatus, and wherein the armature is a hollow-cylindrical armature that does not rotate.

4. The actuator assembly according to claim 1, further comprising a spacer at least partially disposed within the housing, wherein the spacer is annular and adjacent to the armature.

5. The actuator assembly according to claim 1, further comprising a controller coupled to the housing, wherein the controller is in electrical communication with the sensor.

6. The actuator assembly according to claim 1, wherein the first sensing element is disposed between the armature and the housing and concentrically about a portion of the actuator component, and wherein the armature is coupled to a locking gear.

7. The actuator assembly according to claim 1, wherein the first sensing element is disposed between the armature and the actuator component and concentrically about a portion of the actuator component, and wherein the armature is coupled to a locking gear.

8. The actuator assembly according to claim 1, wherein the first sensing element is disposed in a recess formed in the housing and concentrically about a portion of the actuator component, and wherein the armature is coupled to a locking gear.

9. The actuator assembly of claim 1, wherein the sensor further includes a second sensing element disposed radially adjacent to the armature.

10. An actuator assembly, comprising:
a housing;
an actuator component disposed within the housing;
an armature disposed within the housing, the armature selectively positionable between a first position and a second position;
a sensor including a first sensing element disposed within the housing adjacent to the armature, wherein a physical property of the first sensing element varies based upon a position of the armature; and
a second sensing element disposed within the housing adjacent to the armature and concentrically about a portion of the actuator component, and wherein the armature is coupled to a locking gear.

11. The actuator assembly according to claim 10, wherein the sensor includes an array of at least one of the first sensing element and the second sensing element.

12. The actuator assembly according to claim 10, wherein at least one of the first sensing element and the second sensing element is a coil.

13. The actuator assembly according to claim 10, wherein a physical property of the second sensing element varies based upon a position of the armature.

14. The actuator assembly according to claim 13, wherein the physical property of at least one of the first sensing element and the second sensing element is inductance.

15. A method of determining a state of a differential apparatus, comprising the steps of:
providing an axle assembly including a differential apparatus and an actuator assembly coupled to the differential apparatus, wherein the differential apparatus includes a locking gear, and wherein the actuator assembly includes a housing having an actuator component, an armature, and a sensor disposed therein, wherein the armature is selectively positionable between a first position and a second position, wherein the sensor includes a first sensing element disposed within the housing adjacent to the armature, and wherein a physical property of the first sensing element varies based upon a position of the armature;
measuring the physical property of the first sensing element;
transmitting the measured physical property of the first sensing element from the sensor to a controller;
determining the position of the armature based upon the measured physical property of the first sensing element; and
determining the state of the differential apparatus based upon the position of the armature,
wherein the actuator assembly further includes a second sensing element disposed within the housing adjacent to the armature, and a spacer at least partially disposed within the housing, wherein the spacer is annular and adjacent to the armature.

16. The method according to claim 15, further comprising the step of:
adjusting the position of the armature via the controller; and
determining a position of the locking gear of the differential apparatus based upon the position of the armature, wherein the first sensing element is disposed concentrically about a portion of the actuator component.

17. The method according to claim 15, wherein a physical property of the second sensing element varies based upon the position of the armature.

18. The method according to claim 17, further comprising the steps of:
measuring the physical property of the second sensing element;
transmitting the measured physical property of the second sensing element from the sensor to the controller; and
determining the position of the armature based upon the measured physical property of at least one of the first sensing element and the second sensing element.

19. The method according to claim 18, wherein the physical property of at least one of the first sensing element and the second sensing element is inductance.

20. The method according to claim 19, further comprising the step of:
differentiating between the inductance of the first and second sensing elements to compensate for a variation in a radial position of the armature.

* * * * *